(12) United States Patent
Rath

(10) Patent No.: US 11,433,940 B2
(45) Date of Patent: Sep. 6, 2022

(54) ELECTROMECHANICAL POWER STEERING SYSTEM HAVING A HELICAL GEAR MECHANISM AND HAVING A COMPENSATION DEVICE FOR SUPPORTING A FLOATING BEARING ON THE GEAR HOUSING

(71) Applicants: thyssenkrupp Presta AG, Eschen (LI); thyssenkrupp AG, Essen (DE)

(72) Inventor: Krisztian Rath, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 353 days.

(21) Appl. No.: 16/649,736

(22) PCT Filed: Oct. 2, 2018

(86) PCT No.: PCT/EP2018/076720
§ 371 (c)(1),
(2) Date: Mar. 23, 2020

(87) PCT Pub. No.: WO2019/068674
PCT Pub. Date: Apr. 11, 2019

(65) Prior Publication Data
US 2020/0262471 A1    Aug. 20, 2020

(30) Foreign Application Priority Data
Oct. 5, 2017    (DE) .................... 10 2017 123 150.1

(51) Int. Cl.
*B62D 5/04*    (2006.01)
*B62D 3/12*    (2006.01)

(52) U.S. Cl.
CPC ............. *B62D 5/0454* (2013.01); *B62D 3/12* (2013.01); *B62D 5/0421* (2013.01)

(58) Field of Classification Search
CPC ................................ B62D 5/0454; B62D 3/12
See application file for complete search history.

(56) References Cited

U.S. PATENT DOCUMENTS 7,360,467 B2 *   4/2008  Segawa ............... H02K 7/1166
                                                  180/444
2001/0040067 A1   11/2001 Murakami
                    (Continued)

FOREIGN PATENT DOCUMENTS

CN          1738983 A     2/2006
CN        101868637 A    10/2010
                    (Continued)

OTHER PUBLICATIONS

English Translation of International Search Report issued in PCT/EP2018/076720, dated Jan. 16, 2019.

*Primary Examiner* — Kevin Hurley
(74) *Attorney, Agent, or Firm* — thyssenkrupp North America, LLC

(57) ABSTRACT

An electromechanical power steering system may include an electric motor with a motor shaft that drives a shaft that meshes with a helical gearwheel. The shaft may be disposed in a gear housing, and a first end of the shaft may be mounted in a bearing arrangement such that the shaft is rotatable about an axis of rotation. A second end of the shaft may be mounted in a floating bearing in the gear housing. The floating bearing may be enclosed by a compensation device having an inner ring that on two radially opposite sides includes a respective nose formed from an elastomer. The compensation device may also include an outer ring that encloses the inner ring circumferentially. The outer ring may have lugs for receiving the noses. In an unloaded state, a gap may exist between the inner ring and the outer ring outside a region of the noses.

14 Claims, 4 Drawing Sheets

(56) References Cited

U.S. PATENT DOCUMENTS

| | | |
|---|---|---|
| 2003/0127277 A1 | 7/2003 | Murakami |
| 2004/0222036 A1 | 11/2004 | Berhard |
| 2004/0245040 A1 | 12/2004 | Eda |
| 2010/0260448 A1 | 10/2010 | Hafermalz et al. |
| 2012/0061168 A1 | 3/2012 | Hamakita et al. |
| 2012/0272765 A1 | 11/2012 | Fuechsel et al. |
| 2012/0322566 A1 | 12/2012 | Kim |
| 2015/0053034 A1 | 2/2015 | Fuechsel et al. |
| 2015/0266506 A1 | 9/2015 | Sato |
| 2016/0031473 A1 | 2/2016 | Riepold |
| 2016/0137219 A1 | 5/2016 | Schröder et al. |

FOREIGN PATENT DOCUMENTS

| | | | | |
|---|---|---|---|---|
| CN | 102398628 | A | 4/2012 | |
| CN | 102770675 | A | 11/2012 | |
| CN | 102837726 | A | 12/2012 | |
| CN | 104203721 | A | 12/2014 | |
| CN | 109563910 | B * | 4/2022 | ........... B62D 5/0409 |
| DE | 101 22 434 | A | 11/2001 | |
| DE | 101 61 715 | A | 6/2003 | |
| DE | 10 2008 001 878 | A | 11/2009 | |
| DE | 10 2008 041 112 | A | 2/2010 | |
| DE | 10 2013 010 360 | A | 12/2014 | |
| DE | 10 2013 018 436 | A | 5/2015 | |
| DE | 10 2014 105 921 | A | 10/2015 | |
| DE | 10 2008 041 112 | A1 | 2/2019 | |
| EP | 1 637 769 | A | 3/2006 | |
| WO | 2015062739 | A | 5/2015 | |
| WO | WO-2015165698 A1 * | | 11/2015 | ............... B62D 3/04 |

* cited by examiner

ELECTROMECHANICAL POWER STEERING SYSTEM HAVING A HELICAL GEAR MECHANISM AND HAVING A COMPENSATION DEVICE FOR SUPPORTING A FLOATING BEARING ON THE GEAR HOUSING

CROSS REFERENCE TO RELATED APPLICATIONS

This application is a U.S. National Stage Entry of International Patent Application Serial Number PCT/EP2018/076720, filed Oct. 2, 2018, which claims priority to German Patent Application No. DE 10 2017 123 150.1, filed Oct. 5, 2017, the entire contents of both of which are incorporated herein by reference.

FIELD

The present disclosure generally relates to steering systems, including electromechanical power steering systems.

BACKGROUND

A known electromechanical power steering system has an electric servomotor, which drives a worm shaft which meshes with a worm gear, which is arranged on a steering shaft or directly on a steering pinion, which engages with a rack. The worm shaft is coupled to a shaft of the electric motor. The worm gear is connected in a rotationally fixed manner to the steering shaft or the steering pinion. The worm shaft of a conventional worm gear mechanism has a fixed bearing at its drive end and a floating bearing at its free end.

Laid-open application DE 10 161 715 A1 discloses a worm gear mechanism in which the worm can be pivoted perpendicularly to the axis of rotation and is supported via a bearing. The worm shaft is subjected radially to a prestressing force and is pushed against the worm-gear toothing. The prestressing force is provided here via a spring and a pressure-exerting device. This solution proves to be disadvantageous since the occurrence of noise cannot be avoided.

DE 10 2014 105 921 A1 discloses a pivot bearing which is accommodated in a sleeve which has two radially opposite and radially inwardly or outwardly directed bearing noses for forming the pivoting element. An outer ring of the bearing lies just loosely against the bearing noses and can move freely. This gives rise to undesired development of noise and friction.

Thus a need exists for an electromechanical power steering system which has a worm gear mechanism in which noise and friction can be reduced.

DETAILED DESCRIPTION

Figure 1:
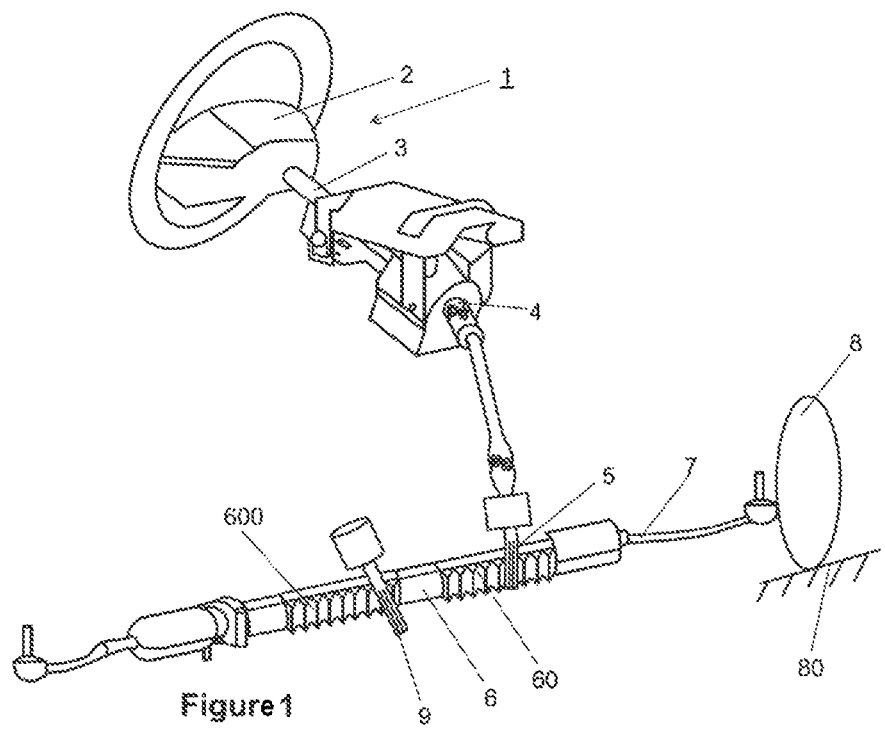
FIG. 1 is a schematic view of an example electromechanical power steering system having a dual-pinion steering mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to electromechanical power steering systems. In some electromechanical power steering systems, an electric motor generates a torque that is transmitted to a gear mechanism and is available to a driver as power assistance for steering purposes.

Accordingly, the invention provides an electromechanical power steering system comprising an electric servomotor or an electric motor with a motor shaft which drives a shaft which meshes with a helical gearwheel, wherein the shaft is arranged in a gear housing and, at its first end, is mounted in a bearing arrangement such that it can be rotated about an axis of rotation and, at its second end, is mounted in a floating bearing, wherein the floating bearing is enclosed by a compensation device, which has an inner ring which, on two radially opposite sides, has a respective nose, which is formed from an elastomer, and in that the compensation device has an outer ring, which encloses the inner ring circumferentially, wherein the outer ring has appropriately formed lugs for accommodating the noses and, in an unloaded state, there is a gap present between the inner ring and the outer ring, outside the region of the noses. The compensation device can thus compensate for wear, manufacturing tolerances and thermal expansion. It is of straightforward construction and does not require much installation space.

The noses are preferably formed in one piece with the inner ring.

It is advantageous if the noses are slit in a radial direction. This gives rise to better damping properties.

In a preferred embodiment, the first end is an end of the shaft which is in the vicinity of the motor and is mounted in a bearing arrangement, and the second end is an end of the shaft which is remote from the motor and is mounted in the floating bearing. It is conceivable, and possible, for the first end to be an end of the shaft which is remote from the motor and for the second end to be an end of the shaft which is in the vicinity of the motor.

It is preferable for the outer ring to be pressed in the gear housing and for the two lugs of the outer ring to be spaced apart from an inner surface of the gear housing by a gap or for the two lugs of the outer ring not to have any contact with the unworked surface of the gear housing. This means that manufacturing costs can be reduced, since the gear housing has to be machined only in the region of the bearing seat.

It is preferable for the noses to serve as damping elements and to damp the movement of the inner ring in the outer ring.

In an advantageous embodiment, the longitudinal axis of the noses is oriented perpendicularly to the axis of rotation of the shaft and perpendicularly to a movement direction of the compensation device, wherein, along the movement direction, there is only a small amount of prestressing force, if any at all, prestressing the shaft onto the helical gearwheel. The shaft can thus be prestressed in the direction of the helical gearwheel, whereas rigidity is ensured in a direction perpendicular to the shaft axis.

The noses preferably define a pivot axis about which the shaft can be pivoted in the direction of the helical gearwheel.

It is preferred for the floating bearing to be pressed into the inner ring. The inner ring and the outer ring of the compensation device are preferably produced from plastic material.

In another exemplary embodiment, provision can be made for the inner ring of the compensation device to be formed by the outer ring of the floating bearing and the outer ring, on two radially opposite sides, has a respective nose, which is formed from an elastomer, and the outer ring of the floating bearing is enclosed circumferentially by a sleeve, wherein the sleeve has appropriately formed lugs for accommodating the noses, and, in an unloaded state, there is a gap present between the outer ring of the floating bearing and the sleeve, outside the region of the noses. In other words, the noses are arranged on the outer ring of the floating bearing and a sleeve, in a manner analogous to the outer ring of the compensation device, encloses the outer ring of the floating bearing. The compensation device thus comprises just one part, as a result of which movement and corresponding friction between contact surfaces can be reduced or prevented.

Provision can be made for the electric motor or the electric servomotor of the electromechanical power steering system to be arranged on a steering column or to act on a steering pinion connected to the steering shaft. In the case of the electromechanical power steering systems having a dual-pinion steering mechanism, the electric servomotor can act on a steering pinion connected to the steering shaft and/or can act on a second pinion, which is spaced apart from the steering pinion and meshes with the rack.

In all the embodiments, it is preferred for the helical gearwheel to be a worm gear and for the shaft to be a worm shaft.

FIG. 1 schematically illustrates an electromechanical motor-vehicle steering system 1 having a steering wheel 2, which is coupled in a rotationally fixed manner to an upper steering shaft 3 and to a lower steering shaft 4. The upper steering shaft 3 is in functional connection with the lower steering shaft 4 via a torsion bar (not illustrated). The lower steering shaft 4 is connected in a rotationally fixed manner to a steering pinion 5. The steering pinion 5 meshes in a known manner with a first toothing region 60 of a rack 6. The rack 6 is mounted in a steering-system housing such that it can be displaced in the direction of its longitudinal axis.

At its free end, the rack 6 is connected to tie rods 7 via ball-and-socket joints (not illustrated). The tie rods 7 themselves are connected in a known manner to a respective steered wheel 8 of the motor vehicle via steering knuckles. Rotation of the steering wheel 2 results, via the connection of the steering shaft 3, 4 and of the steering pinion 5, in longitudinal displacement of the rack 6 and thus in pivoting of the steered wheels 8. The steered wheels 8 undergo a reaction from a carriageway 80, and this reaction counteracts the steering movement. Force is therefore necessary for the purpose of pivoting the wheels 8, and said force requires a corresponding torque on the steering wheel 2. At a distance apart from the first toothing region 60, in which the steering pinion 5 meshes with the rack 6, there is a second toothing region 600, in which a second pinion 9 engages with the rack 6.

An electric motor or an electric servomotor of a servo unit is provided in order to assist the driver with a steering movement. The servo unit can be arranged here in the form of a superimposed steering system on the steering column or in the form of a power-assistance device on the steering pinion 5 and/or the second pinion 9.

Figure 2:
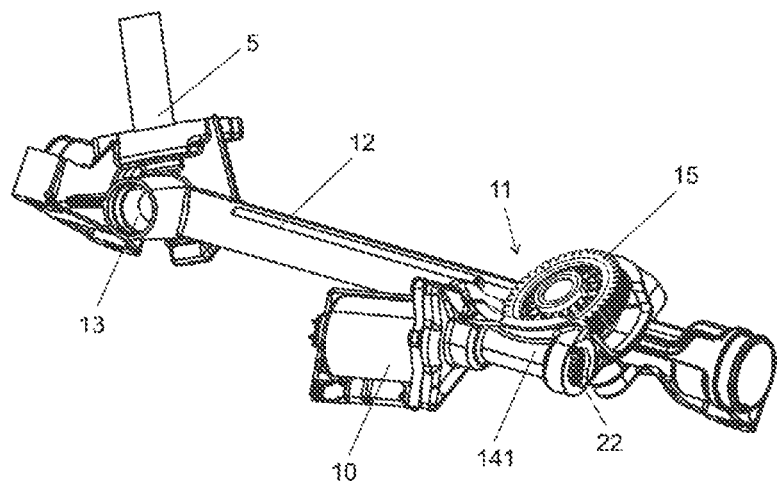
FIG. 2 is a perspective view of an example gear mechanism of the example power steering system from FIG. 1.

FIG. 2 illustrates the steering housing 12 with the electric motor 10 and a gear mechanism 11. The interior of the elongate and essentially hollow cylindrical steering housing 12 accommodates the rack 6 such that it can be displaced in the longitudinal direction. On the side which is directed away from the steering pinion 5, the steering housing 12 has an accommodating bore 13, in which a pressure-exerting piece can be integrated in order to prestress the rack 6 against the steering pinion 5. The electric motor 10 is provided at a distance apart from the steering pinion. The electric motor 10 drives the worm shaft 14, which, by way of its worm, engages with a worm gear 15, that is connected in a rotationally fixed manner to the second pinion 9. During operation of the electric motor 10, the worm shaft 14 is driven and the worm shaft 14 and the worm gear 15 rotate correspondingly, in order to introduce an assistance torque directly into the second pinion 9.

Figure 3:
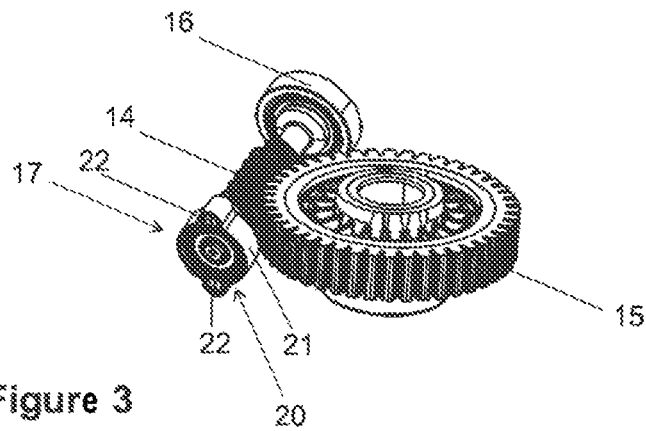
FIG. 3 is a perspective view of the example gear mechanism from FIG. 2 reduced to a worm shaft, a compensation device, and a worm gear.
Figure 4:
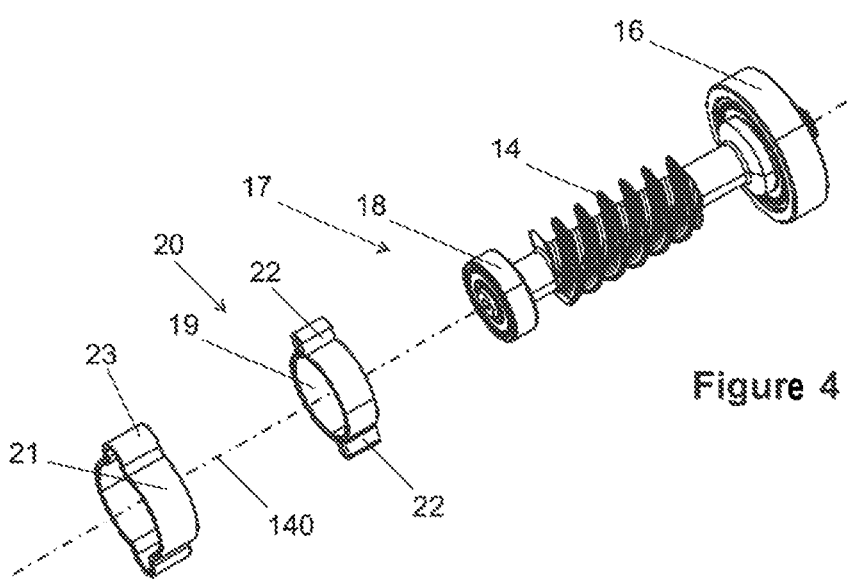
FIG. 4 is an exploded view of the example compensation device from FIG. 3.

FIG. 3 shows a perspective illustration of the worm shaft 14, with a bearing arrangement 16 which is in the vicinity of the motor and a bearing arrangement 17 which is remote from the motor, and of the worm gear 15, which meshes with the worm shaft. 14, wherein components of the gear housing have been omitted.

FIGS. 4 to 7 show the details of the bearing arrangement, in particular of the bearing arrangement 17 which is remote from the motor.

Figure 5:
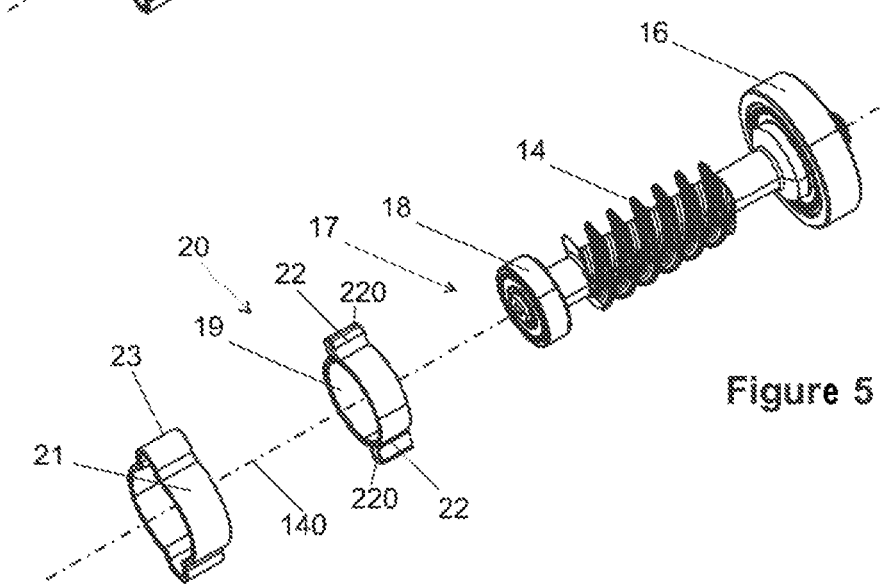
FIG. 5 is an exploded view of an example compensation device having slit noses.
Figure 6:
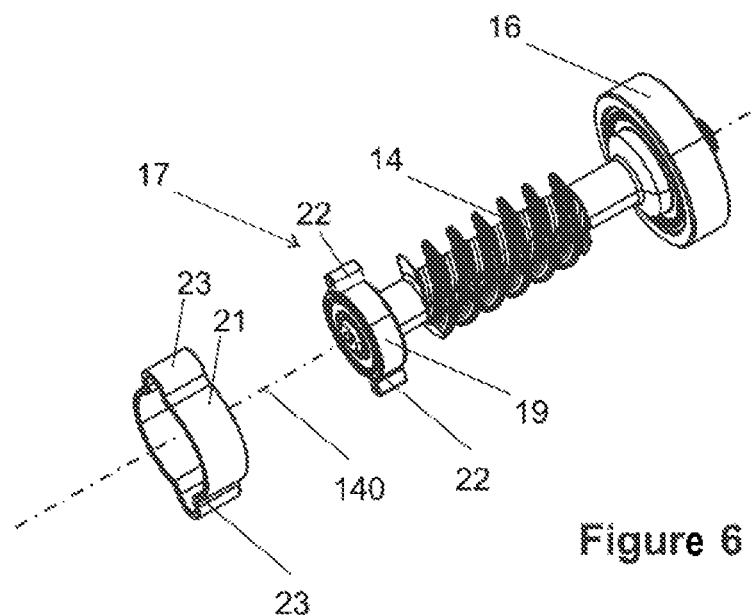
FIG. 6 is another exploded view of the example compensation device from FIG. 4, in this case with an inner ring pressed on a floating bearing.
Figure 7:
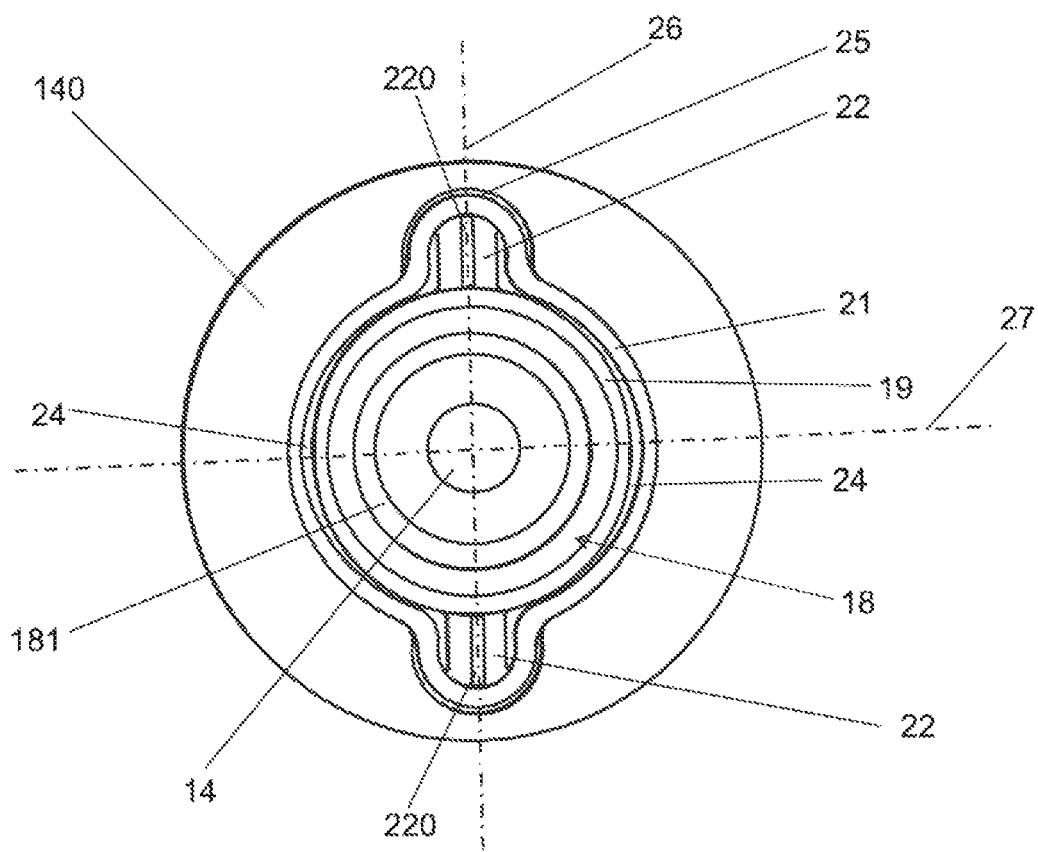
FIG. 7 is a side view of the example compensation device from FIG. 5.

The bearing arrangement 16 which is in the vicinity of the motor has a fixed bearing. The bearing arrangement 17 which is remote from the motor comprises a rolling-contact bearing 18, which is designed in the form of a floating bearing and allows slight axial movements and alterations of the axis of rotation of the worm shaft 14 in relation to the gear housing 141. The rolling-contact bearing 18, which is remote from the motor, is pressed in a sleeve-form inner ring 19 of a compensation device 20. The compensation device 20 also has a sleeve-form outer ring 21, which encloses the inner ring 19 circumferentially. On two radially opposite sides, the inner ring 19 of the compensation device 20 has protrusions, which are referred to as noses 22, which are formed from an elastomer. With the exception of the noses 22, the inner ring 19 is circular. The elastomeric noses 22 are formed in one piece with the inner ring 19 and can be slit 220, as illustrated in FIG. 5, in order thus to provide for better rigidity and damping properties. For the purpose of accommodating the noses 22, the outer ring 21 has appropriately formed depressions or clearances, which are referred to as lugs 23. In the exemplary embodiment shown, the noses 22 of the inner ring 19, and correspondingly the lugs 23 of the outer ring 21, are rounded or arcuate in the region of contact. It is possible for both to be flattened or conical in the region of contact. It is also conceivable, and possible, for the noses 22 to be arranged at an angle of up to 45° in relation to a longitudinal axis 26. The lugs 23 of the outer ring 22 are formed in a manner corresponding to said angle. It is possible for the noses to fill the entire region of the lugs or else, as illustrated in FIG. 7, to be positioned with a gap in relation to one or more walls of the lugs formed. With the exception of the regions in which the lugs are provided, the outer ring is circular. A gap/amount of play 24 is present between the inner ring 19 and the outer ring 21, outside the region of the noses 22 and/or of the lugs; said gap/amount of play allows the worm shaft 14 to be prestressed in the direction of the worm gear 15, whereas rigidity is ensured in a direction perpendicular to the worm axis 140. In other words, the inner ring 19 can move correspondingly in the outer ring 21 in a direction perpendicular to the longitudinal axis 26 of the elastomeric noses 22. In the direction of the longitudinal axis of the elastomeric noses 22, the level of rigidity is very high and permits only minimal movement of the inner ring 19, if any at all. The elastomeric noses 22 serve as a damping element. The maximum amount of possible radial movement of the inner ring 19 is limited by the latter striking against the outer ring 21.

The outer ring 21 is pressed in the housing portion 141 of the cast housing 12, as illustrated in FIG. 7. The cylindrical diameter of the cast housing is machined mechanically, to be precise such that the two lugs 23 of the outer ring 21 do not have any contact with the unworked surface or the inner surface of the cast housing and are spaced apart from the inner surface by a gap 25. The inner surface of the cast housing is designed in arcuate form, in a manner corresponding to the shape of the lugs of the outer ring.

The compensation device 20 is inserted in the housing such that the longitudinal axis 26 of the elastomeric noses 22 or of the lugs 23 of the outer ring 21 is perpendicular to the axis of rotation of the worm shaft 14, wherein the longitudinal axis 26 of the elastomeric noses is oriented on the worm shaft 14 such that the elastomeric noses 22 are located perpendicularly to a neutral plane which corresponds to the movement direction 27 of the compensation device 20. Projected separation forces along the movement direction 27 are identical, which is manifested in that there is only a small amount of prestressing force, if any at all, of the toothing of the worm shaft in relation to the toothing of the worm gear, and therefore tooth-separation forces for the two directions of rotation are identical. The radial separation force between the worm gear and worm shaft is dependent on the direction of rotation. The worm shaft 14 is subjected radially to a prestressing force and is pushed against the worm-gear toothing. The position of the worm shaft 14 can therefore be adjusted in relation to the worm gear 15 by means of the compensation device 20. Adjustment therefore takes place at that end of the worm shaft 14 which is remote from the motor. The elastomeric noses 22 define a pivot axis, and therefore the worm shaft 14 can move in the direction of the worm gear.

The inner ring 19 and the outer ring 21 of the compensation device 20 are preferably produced from plastic material.

Figure 8:
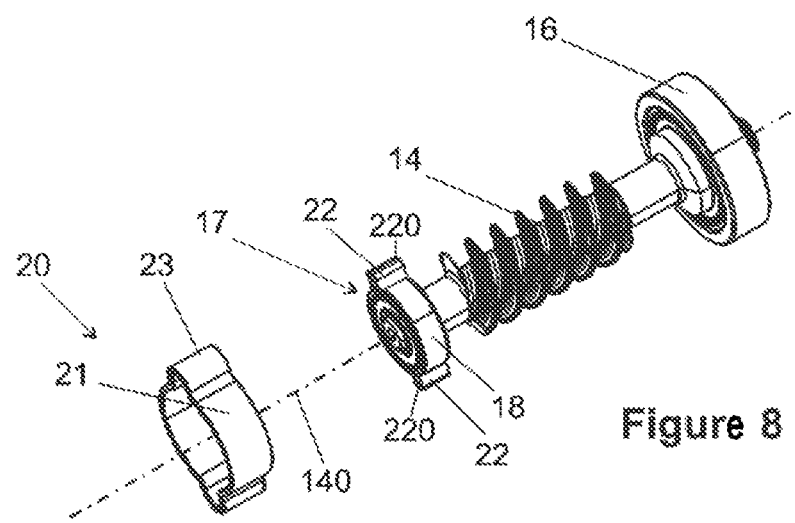
FIG. 8 is an exploded view of another example compensation device, in this case seated on an outer ring of a floating bearing.

In FIG. 8, provision is made for the noses 22 to be positioned directly on the outer ring of the floating bearing, wherein said noses are accommodated in the lugs 23 of a sleeve 21, which is manufactured preferably from plastic material, it being possible for the number of components to be reduced in this way.

The compensation device is not restricted to use in a dual-pinion steering mechanism. It is also possible for the compensation device to be used in a single-pinion steering mechanism or, as illustrated in FIG. 9, in a steering assistance system of which the electric motor is arranged on the upper steering column.

Figure 9:
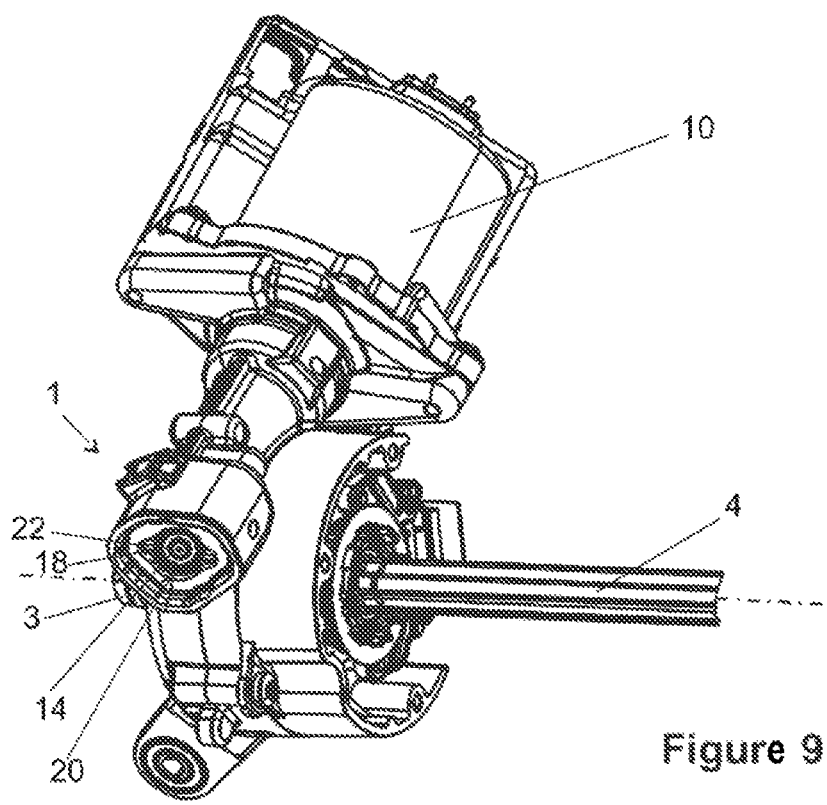
FIG. 9 is an exploded view of an electromechanical power steering system having an example power-assistance electric motor acting on a steering shaft.

FIG. 9 shows an electromechanical motor-vehicle power steering system 1 having an electric motor 10, which assists the steering movement performed by a driver on a steering column. For assistance purposes, the shaft of the electric motor is coupled into the rotation of the steering shaft via a worm gear mechanism. The upper steering shaft 3 is connected in a rotationally fixed manner directly to a steering wheel (not illustrated). The electric motor 10 drives the lower steering shaft 4 via the worm gear mechanism, said steering shaft being connected to a rack-and-pinion steering mechanism (not illustrated). The worm shaft 14 of the worm gear mechanism, as described above, is mounted, at its end which is remote from the motor, in a floating bearing 18, with a compensation device 20, in the gear housing.

What is claimed is:

1. An electromechanical power steering system comprising:
    an electric motor with a motor shaft that drives a shaft that meshes with a helical gearwheel, wherein the shaft is disposed in a gear housing, wherein a first end of the shaft is mounted in a bearing arrangement such that the shaft is rotatable about an axis of rotation, wherein a second end of the shaft is mounted in a floating bearing in the gear housing; and
    a compensation device that encloses the floating bearing, the compensation device having an inner ring that on two radially opposite sides includes a respective nose formed from an elastomer, wherein the compensation device includes an outer ring that encloses the inner ring circumferentially, wherein the outer ring has lugs for receiving the noses, wherein in an unloaded state a gap exists between the inner ring and the outer ring outside a region of the noses.

2. The electromechanical power steering system of claim 1 wherein the noses are integral with the inner ring.

3. The electromechanical power steering system of claim 1 wherein the noses are slit in a radial direction.

4. The electromechanical power steering system of claim 1 wherein the outer ring is press-fit in the gear housing, wherein the lugs of the outer ring are spaced apart from an inner surface of the gear housing by a gap.

5. The electromechanical power steering system of claim 1 wherein the lugs serve as a damping element and damp movement of the inner ring in the outer ring.

6. The electromechanical power steering system of claim 1 wherein a longitudinal axis of the noses is oriented perpendicularly to the axis of rotation of the shaft and perpendicularly to a movement direction of the compensation device.

7. The electromechanical power steering system of claim 1 wherein the noses define a pivot axis about which the shaft is pivotable in a direction of the helical gearwheel.

8. The electromechanical power steering system of claim 1 wherein the floating bearing is press-fit in the inner ring.

9. The electromechanical power steering system of claim 1 wherein the inner and outer rings comprise plastic.

10. An electromechanical power steering system comprising an electric motor with a motor shaft that drives a shaft that meshes with a helical gearwheel, wherein the shaft is disposed in a gear housing, wherein a first end of the shaft is mounted in a bearing arrangement such that the shaft is rotatable about an axis of rotation, wherein a second end of the shaft is mounted in a floating bearing in the gear housing, wherein the floating bearing includes an outer ring that on two radially opposite sides includes a respective nose formed from an elastomer, wherein the outer ring is enclosed circumferentially by a sleeve, wherein the sleeve includes lugs for receiving the noses, wherein in an unloaded state a gap exists between the outer ring and the sleeve outside a region of the noses.

11. The electromechanical power steering system of claim 10 wherein the electric motor is disposed on a steering column.

12. The electromechanical power steering system of claim 10 wherein the electric motor acts on a steering pinion connected to a steering shaft.

13. The electromechanical power steering system of claim 10 comprising a dual-pinion steering mechanism, wherein the electric motor acts on a steering pinion connected to a steering shaft and/or acts on a second pinion that is spaced apart from the steering pinion and meshes with a rack.

14. The electromechanical power steering system of claim 10 wherein the helical gearwheel is a worm gear and the shaft is a worm shaft.

* * * * *